United States Patent [19]
Takada et al.

[11] Patent Number: 5,791,659
[45] Date of Patent: Aug. 11, 1998

[54] METAL GASKET

[75] Inventors: Kazukuni Takada, Ibaragi; Hiroshi Uemura, Higashiosaka; Masahiko Miura, Osaka-fu; Kazuya Nakata, Toyota; Yoshikazu Shinpo, Nisshin, all of Japan

[73] Assignees: Nippon Gasket Co., Ltd., Osaka-fu; Toyota Jidosha Kabushiki Kaisha, Aichi-ken, both of Japan

[21] Appl. No.: 912,861

[22] Filed: Aug. 19, 1997

Related U.S. Application Data

[63] Continuation of Ser. No. 710,533, Sep. 19, 1996, abandoned.

[30] Foreign Application Priority Data

Oct. 9, 1995 [JP] Japan ................... 7-286355

[51] Int. Cl.[6] ........................... F16J 15/08
[52] U.S. Cl. ........................ 277/593; 277/595
[58] Field of Search .................. 277/180, 235 B

[56] References Cited

U.S. PATENT DOCUMENTS

| | | | |
|---|---|---|---|
| 4,480,844 | 11/1984 | Kozerski | 277/235 B |
| 5,087,058 | 2/1992 | Miura et al. | 277/235 B |
| 5,236,205 | 8/1993 | Chen et al. | 277/235 B |
| 5,286,039 | 2/1994 | Kawaguchi et al. | 277/235 B |
| 5,408,963 | 4/1995 | Miyaoh et al. | 277/235 B |
| 5,544,901 | 8/1996 | Kuboichi et al. | 277/235 B |
| 5,568,932 | 10/1996 | Tanaka et al. | 277/235 B |
| 5,601,292 | 2/1997 | Tanaka et al. | 277/180 |
| 5,609,345 | 3/1997 | Miura et al. | 277/180 |

FOREIGN PATENT DOCUMENTS

| | | | |
|---|---|---|---|
| 0544951B1 | 12/1991 | European Pat. Off. | |
| 574770 | 12/1993 | European Pat. Off. | 277/235 B |
| 62-155374 | 7/1987 | Japan | |
| 62-181756 | 11/1987 | Japan | |
| 63-59262 | 4/1988 | Japan | |
| 63-62668 | 4/1988 | Japan | |
| 63-74561 | 5/1988 | Japan | |
| 63-74562 | 5/1988 | Japan | |
| 63-293363 | 11/1988 | Japan | |
| 64-3059 | 1/1989 | Japan | |
| 165367 | 3/1989 | Japan | |
| 138439 | 6/1991 | Japan | 277/235 B |
| 466457 | 6/1992 | Japan | |
| 51731 | 1/1993 | Japan | |
| 55331 | 2/1993 | Japan | |
| 185623 | 7/1994 | Japan | 277/235 B |
| 8100859 | 4/1996 | Japan | |

OTHER PUBLICATIONS

Japanese Patent Abstract No. 1-104953 filed 21 Apr. 1989.
Japanese Patent Abstract No. 1-35057 filed 02 Jun. 1989.
Japanese Patent Abstract No. 63-246571 filed 13 Oct. 1988.
Japanese Patent Abstract No. 63-246572 filed 13 Oct. 1988.
Japanese Patent Abstract No. 1-73157 filed 17 Mar. 1989.

*Primary Examiner*—Scott Cummings
*Attorney, Agent, or Firm*—Browdy and Neimark

[57] ABSTRACT

The present invention comprises a pair of bead plates on which beads are formed, and an intermediate plate on which first and second stepped portions are formed. One of the bead plates is provided with auxiliary beads so as to prevent a full compression of the beads and increase the sealability. This metal gasket comprises first and second bead plates having beads and extending along the circumferences of holes, and an intermediate plate interposed between the bead plates. The intermediate plate is provided in the regions thereof which extend along the circumferences of the holes and on the inner side of the beads with first stepped portions extending toward the first bead plate, and second stepped portions extending toward the second bead plate. The second bead plate is provided with auxiliary beads extending toward the second stepped portions. The auxiliary beads are adapted to engage the intermediate plate to increase the surface pressure and prevent the leakage of a high-temperature gas toward the beads on the first and second bead plates and the permanent set in fatigue of wing parts of the second stepped portions of the intermediate plate.

9 Claims, 5 Drawing Sheets

METAL GASKET

This application is a continuation of application Ser. No. 08/710,533, filed Sep. 19, 1996 now abandoned.

BACKGROUND OF THE INVENTION

1. Field of the Invention

This invention relates to a metal gasket used to seal a clearance between the opposed fixing surfaces in a multi-cylinder engine, and comprising a pair of bead plates on which beads are formed along the circumferences of holes, and an intermediate plate interposed between the two bead plates.

2. Description of the Prior Art

The conventional structural members of an engine, such as aluminum cylinder head and cylinder block have small weight but a low rigidity, so that the relative displacement of the two members during an operation of the engine tends to increase. Accordingly, a metal gasket for sealing a clearance between the opposed surfaces of the two structural members is formed by elastic metal plates provided with beads in the vicinity of the circumferences of cylinder bores (combustion chambers) and through holes corresponding to water and oil passages.

The known metal gaskets include a metal gasket formed by a pair of bead plates comprising elastic metal plates on which beads are formed, and an intermediate plate interposed between the bead plates. When the metal gasket is held between the opposed surfaces of a cylinder head and a cylinder block, tightened and compressed in a fully buckled state, the bead plates and intermediate plate are pressed forcibly against one another at the beads thereof and the portions thereof which are in the vicinity of the beads between the opposed surfaces due to a reaction occurring when the beads on the two bead plates are crushed and deformed, and thus, the sealing function of the metal gasket of preventing a fluid passing through the through holes from leaking from the mentioned opposed surfaces can be fulfilled. The intermediate plate is provided with compensating portions having a stopping function of restricting the deformation of the two bead plates and an offsetting function of compensating for the irregularity of the clearance between the opposed surfaces, which functions are fulfiled when the metal gasket is tightened between the cylinder head and cylinder block.

This type of metal gaskets include the metal gasket disclosed in Japanese Patent Laid-Open No. 155374/1987 which is provided with grommets on an intermediate plate, and the laminated metal gasket disclosed in Japanese Patent Laid-Open No. 65367/1989 which is provided with stepped portions and grommets on an intermediate plate. Japanese Patent Laid-Open No. 293363/1983 discloses a laminated metal gasket in which stepped portions are formed by interposing a spacer between laminated intermediate plates. Japanese Utility Model Laid-Open No. 66457/1992 discloses a metal gasket in which one of laminated metal intermediate plates is provided with stepped portions, the other being provided with stepped portions comprising folded portions.

In these metal gaskets, the stepped portions of the intermediate plate are formed by sheet metal work but it is technically difficult to form by sheet metal work the stepped portions to an arbitrary height, or to a completely uniform height around the holes. When an engine continues to be driven with a grommet-carrying metal gasket tightened and compressed in a fully buckled state between a cylinder block and a cylinder head, the grommet-forming stepped portions and folded portions receive bending stress further exerted thereon repeatedly in a residual stress-existing condition, so that cracks and permanent set in fatigue readily occur in the grommets.

In the case of a metal gasket having intermediate plates comprising two or more metal plates in a laminated state, or laminated metal plates and a spacer interposed therebetween, forming bead plates by two metal plates constitutes one of the causes of the above-described problems, and clearances become liable to occur between the laminated metal plates, so that a fluid, such as a combustion gas flowing through the through holes of the metal gasket leaks easily to the outside of the metal gasket through the clearances. An idea of filling up the clearances between the laminated metal plates by coating the metal plates with rubber or a resin for the purpose of preventing the leakage of a fluid has been proposed. However, the clamping force of the bolts, by which a cylinder head and a cylinder block are fixed to each other, decreases gradually as the layer of rubber or resin is deteriorated, and the sealing performance of the gasket lowers. In the case where grommets are formed on an intermediate plate, a bending process the degree of the techniques of which is high cannot be employed due to the necessity of preventing the occurrence of cracks in addition to a decrease in the sealing performance, and the height of stepped portions and the thickness of plates cannot be set independently of each other. When such a gasket is used for an engine, a compression ratio and a total thickness of the gasket are limited. Due to such technical background, the setting of the thickness of the intermediate plate is also limited. When the number of metal plates to be laminated and that of accessory parts increase, the designing, manufacturing and quality control efforts for each part become necessary, so that the overall cost increases.

A conventional metal gasket basically requires two intermediate plates in order to obtain the function of restricting the deformation of the beads on two bead plates at the portions thereof which are around the circumferences of combustion chamber holes, i.e. the full compression preventing function, and in order to obtain compensating portions having the function of offsetting the irregularity of the opposed surfaces of the structural members during a gasket tightening operation. The compensating portions are formed by using additional members, such as spacers, or by forming folded portions on predetermined regions of the metal plates constituting the intermediate plates. Therefore, problems of stress and sealability arise as mentioned above in the compensating portions, and, moreover, an increase in the manufacturing steps and the necessity of quality control occur, so that an increase in cost cannot be avoided.

The applicant of the present invention developed as shown in FIG. 13 the metal gasket having improved compensating portions on its intermediate plate (refer to Japanese Patent Laid-Open No. 100859/1996). In this metal gasket, an intermediate plate 60 interposed between bead plates 51, 52 comprises a metal plate the thickness of which is larger than that of the bead plates 51, 52, and it is provided in the regions thereof which are closer to the holes than the beads 53, 54 on the bead plates 51, 52 with stepped portions 63 extending toward the bead plate 51 and having a height smaller than that of the beads 53, and in the regions thereof which are closer to the holes than the stepped portions 63 with stepped portions 64 extending toward the bead plate 52 and having a height not smaller than that of the stepped portions 63 and smaller than the sum of the height of the stepped portions 63 and that of the beads 54. The annular portions between the two types of stepped portions constitute stoppers, i.e. compensating portions 65 for the bead plate 51, and the annular portions closer to the holes 55 than the stepped portions 64 compensating portions 66 for the bead plate 52. The metal gasket can obtain the compensating portions 65, 66, the thicknesses of which are set arbitrarily within a permissible range, without using additional members or forming folded portions. This enables the surface pressures to be balanced well, the variation of stress of the bead plates 51, 52 and the bending stress exerted on the compensating portions 65, 66 to be reduced, the breakage of the beads 53, 54 and compensating portions 65, 66 and a decrease in the sealing effect to be prevented, a stable sealing effect to be displayed, the compensating portions 65, 66 formed on the intermediate plate 60 to display a sealing effect for protecting the beads 53, 54, and a full compression of the beads 53, 54 to be prevented for the protection of the same. Moreover, these compensating portions 65, 66 are formed to different shapes in different regions so as to extend along the circumferences of the combustion chamber holes 55 and combustion gas holes, or they are formed so as to extend discontinuously. The compensating portions are formed optimumly between the holes 55 and with respect to the positions of the bolts.

The applicant of the present invention has then developed a metal gasket capable of improving the sealing performance at the portions thereof which are around through holes, reducing the variation of stress of the bead plates, preventing the breakage of the beads and a decrease in the sealing effect, displaying a stable sealing effect and being manufactured at a low cost without requiring additional members and without forming portions which must meet the severe stress conditions, such as folded portions, by elaborating the relative construction of the intermediate plate and bead plates with the object of the above-described-previously-developed metal gasket achieved at once.

SUMMARY OF THE INVENTION

An object of the present invention is to solve the above-described problems, add provide a metal gasket comprising a pair of bead plates on which beads are formed, and an intermediate plate interposed between the bead plates and serving as a regulating plate, the intermediate plate being provided with stepped portions at two parts thereof, which are abutted on a first bead plate, a second bead plate being provided with auxiliary beads, whereby the gasket enables the variation of stress of the bead plates to be reduced, the breakage of the beads and the leakage of a fluid, such as a combustion gas from the clearances between the portions of the bead plates and intermediate plate which are in the regions around the holes to be prevented, a stable sealing effect to be secured, and the production of a metal gasket of a high durability to be effected at a reduced cost.

This metal gasket has first and second bead plates comprising elastic metal plates on which beads are formed along the circumferences of holes arranged side by side, and an intermediate plate interposed between the first and second bead plates, which are provided thereon with the beads opposed to each other, and having a thickness larger than those of the bead plates, the intermediate plate being provided on the regions thereof which are on the inner side of the beads (i.e. between the hole then the bead) with first stoppers comprising first stepped portions extending toward the first bead plate and formed to a height smaller than that of the beads, and on the regions thereof which are on the inner side of the first stepped portions with second stoppers comprising second stepped portions extending toward the second bead plate and formed to a height larger than that of the first stepped portions and smaller than the sum of the height of the first stepped portions and that of the beads, the second bead plate being provided with auxiliary beads extending along the circumferences of the holes and projecting toward the second stoppers of the intermediate plate.

The intermediate is formed out of a metal softer than that of the bead plates.

The auxiliary beads comprise half beads extending toward the holes and bent diagonally. In another case, the auxiliary beads comprise half beads extending toward the holes, bent in a stepped manner and provided with flat portions along the circumferences of the holes. The height of the auxiliary beads is substantially a half of that of the beads on the second bead plate.

The heights of the first and second stepped portions of the intermediate plate are set larger in first regions, which are between the holes, and second regions, which are 90° away from the positions between the holes, and smaller in third regions which are halfway between the first and second regions, the heights of these stepped portions varying in boundary regions between the first and third regions and boundary regions between the third and second regions so as to form smoothly curved surface portions.

The first stepped portions of the intermediate plate are separated from one another in the regions between the holes. The beads on the first and second bead plates are separated from one another in the regions between the holes, or meet one another to form a single bead.

In this metal gasket, the first bead plate is disposed so as to face a cylinder head, while the second bead plate is disposed so as to face a cylinder block.

Since the second bead plate in this metal gasket is provided with auxiliary beads, the surface pressure in the regions of the auxiliary beads increases, and the entry of a high-temperature gas into not only the clearances around the beads on the second bead plate but also those around the beads on the first bead plate is prevented to protect the beads. Moreover, wing parts, which are liable to fatigue, and which extend around the holes, of the second stepped portions of the intermediate plate can be reinforced.

The auxiliary beads on the second bead plate can be formed without limiting the size of the beads. Since the auxiliary beads formed on the second bead plate comprise half beads, the degree of limitation placed by the auxiliary beads on the bead sizes is lowered.

When this metal gasket is held between a cylinder head and a cylinder block and tightened by clamping bolts, the bead plates held between the opposed surfaces of the two structural members are gradually brought closer to and into contact with the intermediate plate with the beads bent under pressure, the bead plates being thus put in a compressed state due to the tightening force. During this time, the first and second stepped portions of the intermediate plate offset the irregularity of the clearances between the intermediate plate and bead plates, and prevent a full compression of the beads, this enabling the variation of stress of the beads to be reduced, the entry of a high-temperature gas Into the clearances around the beads of the bead plates to be prevented, and the beads to be protected.

Accordingly, the amount of displacement of the bead plates is restricted after the bead plates engage the stoppers, which comprise corresponding stepped portions, of both surfaces of the intermediate plate, so that the beads are not deformed to the extent of a complete compression in which the beads are completely crushed. Namely, the resilient actions of the beads remain, and the function of offsetting the irregularity of the opposed surfaces of the cylinder head and cylinder block also remain.

Since the height of the stepped portions, which constitute the stoppers, of the intermediate plate with respect to main surface portions of the same plate is smaller than that of the beads on the bead plates, the rigidity of the stoppers is high although they comprise stepped portions. Therefore, the function of the stoppers is not lost, even if they are deformed in a certain case by the gasket tightening force.

In this metal gasket constructed as mentioned above, stepped portions are formed at two parts of one intermediate plate which the beads on two bead plates contact, and the stoppers formed by these stepped portions prevent a full compression of the beads on one opposed bead plate, the intermediate plate being also provided with compensating portions having the function of offsetting the irregularity of the opposed fixing surfaces and the sealing function for the protection of the beads.

The stepped portions formed on the intermediate plate sufficiently offset the clearances between the intermediate plate and bead plates when the beads are fully compressed, and the sealing performance of the gasket can thereby be improved.

In this metal gasket, the bead plate positioned on the side of a cylinder block is provided with auxiliary beads formed along the circumferences of the holes and extending toward the stoppers on the intermediate plate. This enables the wing parts, which are at the circumferences of the holes, of the second stepped portions of the intermediate plate to be reinforced for the prevention of the fatigue thereof, the capability of the gasket of sealing the clearances between the intermediate plate and bead plates to be improved, and the durability of the gasket to be also improved. Moreover, since the auxiliary beads comprise half beads, the limitation placed on the beads formed on the bead plates can be minimized.

This metal gasket comprises the bead plates and intermediate plate interposed therebetween, and a thickness $t_1$ of the intermediate plate is set basically not less than twice as large as that $t_2$ of the bead plates ($t_1/t_2 \geq 2$), and normally around 2–4 times as large as the thickness $t_2$ ($t_1/t_2 \geq 2-4$), the first and second stepped portions bent in different directions from different parts of the intermediate plate being formed along the circumferences of the beads to heights smaller than that of the beads, whereby the first and second stoppers with respect to the bead plates are formed. Accordingly, it becomes possible to prevent the beads from being overcompressed, and the occurrence of permanent set in fatigue of and cracks in the beads. It also becomes possible to prevent the entry of a combustion gas into the clearances in the bead-side portions by the stoppers, protect the beads against corrosion due to a high-temperature gas, and prevent the lowering of the function of the beads.

As described above, this metal gasket can be formed by a pair of bead plates and one intermediate plate only, so that the number of parts and manufacturing steps can be reduced. Since this metal gasket has a simple shape obtained by carrying out a bending process and a bead-forming process, the manufacturing cost can be reduced greatly, and the part-machining accuracy can be improved. The accumulated error can be reduced, and the controlling of the height of the stoppers can be done easily. Owing to the reduction of the number of clearances between the metal layers, the sealing performance of the gasket can be improved, and a product of a high reliability can be provided.

The stoppers on the intermediate plate can be provided on the cylinder head-side surface, the cylinder block-side surface, or both surfaces thereof in the gasket actually installed. The height of the stoppers can be set uniform on the intermediate plate. It can be set different in some cases in different regions around the circumferences of the holes, or correspondingly to the estimated deformation of the fixing surfaces between the cylinder head and exhaust manifold or the estimated deformation thereof due to the heat and explosion occurring during an operation of the engine.

In this metal gasket, additional members, such as spacers are not used to form stoppers on the intermediate plate, nor is the production of such members required. It is not necessary to combine and fix any parts with and to the intermediate plate, so that the manufacturing cost can be reduced. Since stoppers are formed on the intermediate plate, inconveniences which would occur when the assembling and fixing work is imperfectly done are eliminated. The stoppers of the intermediate plate are formed without forming folded portions thereon, and folded portions are not provided on the hole-side edge portions of the bead plates. Therefore, it is not necessary to use the step of forming folded portions and take measures for the prevention of the occurrence of cracks in the folded portions, so that the manufacturing cost can be reduced.

In this metal gasket, the height, measured from the surface of the intermediate plate, of the compensating portions constituting the stoppers can be set arbitrarily in accordance with the set height of the beads, so that the surface pressure balance of the bead plates with respect to the opposed fixing surfaces can be changed suitably. The variation of stress in the bead plates and the bending stress imparted to the compensating portions can be set freely in accordance with the situation when, for example, the properties of the bead plates are different. Consequently, the breakage of the beads on the bead plates and compensating portions and a decrease in the sealing effect can be prevented, and a stable sealing effect can be displayed.

In the case where first and second stepped portions are formed on both surfaces of the intermediate plate to the same height with respect to their respective opposed bead plates, the height of the first compensating portions, which are provided for one bead plate, with respect to one flat surface of the intermediate plate becomes equal to that of the second compensating portions, which are provided for the other bead plate, with respect to the other flat surface of the intermediate plate, and it can be expected that a difference does not occur between the actions of the first and second compensating portions with respect to the bead plates of the same dynamic properties. In this case, the pressure condition of the two bead plates during the compression of the gasket is balanced well. Consequently, the variation of stress in the bead plates and the bending stress on the compensating portions of the intermediate plate are imparted equally and not impartially to the bead plates and compensating portions. This enables the occurrence of the permanent set in fatigue and breakage of the beads on the bead plates, the breakage of the compensating portions and a decrease in the sealing effect to be prevented, and a stable sealing effect to be displayed.

Figure 1:
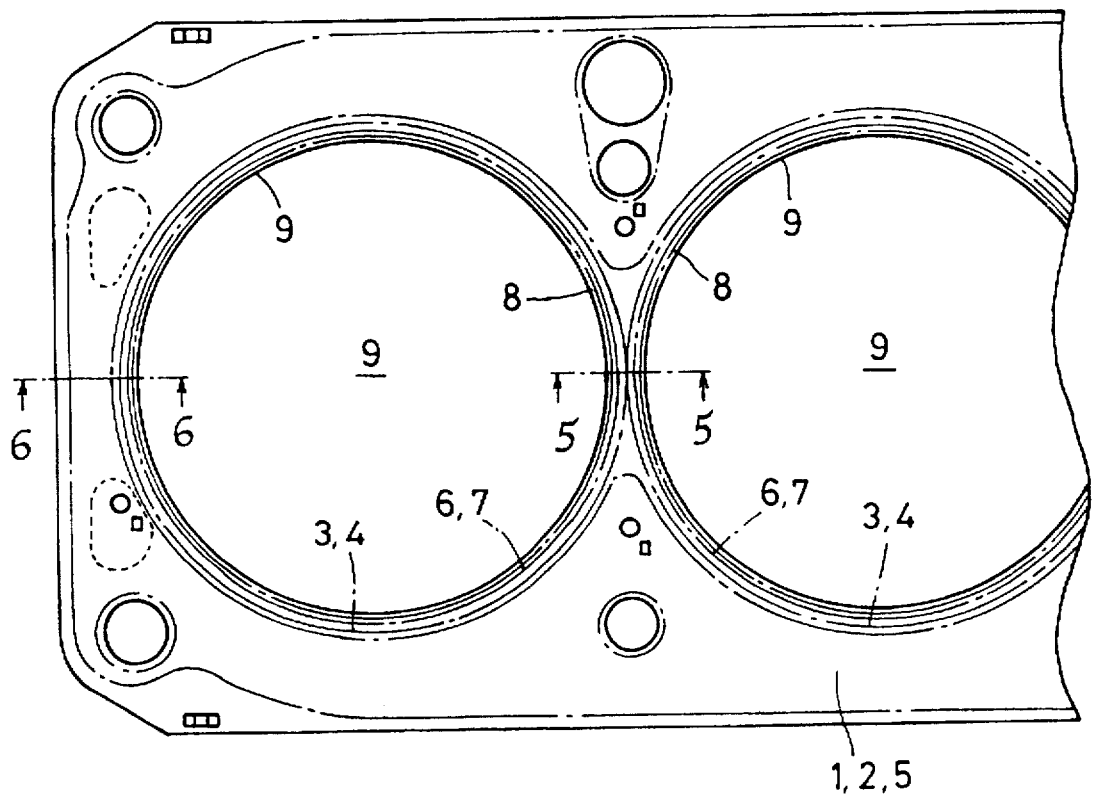
FIG. 1 is a partial plan view showing a first embodiment of the metal gasket according to the present invention.

DESCRIPTION OF THE PREFERRED EMBODIMENTS:

The embodiments of the metal gasket according to the present invention will now be described with reference to the drawings. This metal gasket is adapted to be held between a cylinder head and a cylinder block and seal the clearances between opposed fixing surfaces thereof. This metal gasket is applied to a multi-cylinder engine, such as a 4-cylinder engine and a 6-cylinder engine correspondingly to cylinder bores formed in a cylinder block. The cylinder bore holes, i.e., combustion chamber holes are formed plurally side by side. This metal gasket has various kinds of holes, such as water holes and oil holes in addition to bolt holes, around the above-mentioned holes. In the drawings with reference to which the invention will now be described, the same parts or the parts having the same function are designated by the same reference numerals, and the duplication of description thereof is omitted.

A first embodiment of the metal gasket according to the present invention will now be described with reference to FIGS. 1–9.

This metal gasket is of a three-layer laminate type comprising first and second bead plates 1, 2 of elastic metal plates, and an intermediate plate 5 having a thickness larger than that of the bead plates 1, 2 and interposed between the bead plates 1, 2. The bead plates 1, 2 and intermediate plate 5 are provided with combustion chamber holes 9 in the same positions, and various kinds of holes of these plates are basically identical. A thickness $t_1$ of the intermediate plate 5 is set basically not less than twice as large as that $t_2$ of the bead plates 1, 2 ($t_1/t_2 \geq 2$), and preferably around 2–4 times as large as the thickness t2 ($t_1/t_2 \geq 2-4$). The bead plates 1, 2 are provided with cross-sectionally projecting beads 3, 4, which extend along the circumferences of the combustion chamber holes 9, and substantially concentrically therewith, whereby the beads 3, 4 surround the holes 9 annularly. The beads 3, 4 are formed so that the projecting portions thereof are opposed in the same positions to the intermediate plate 5, and the beads 3, 4 engage the surfaces 25, 26 of the intermediate plate when the plates 1, 2, 5 are laminated and firmly.

The intermediate plate 5 is provided on the regions thereof which are closer to the combustion chamber holes 9 than the surface portions 25, 26 contacting the beads 3, 4 with first stoppers comprising first stepped portions 6 extending toward one bead plate 1 and having a height E smaller than that H of the beads 3 and smaller than a thickness D of the intermediate plate (H>E, D>E), the first stoppers being formed so as to annularly surround the combustion chamber holes 9. The intermediate plate 5 is further provided on the regions thereof which are closer to the combustion chamber holes 9 than the stoppers comprising the first stepped portions 6 with second stoppers comprising second stepped portions 7 extending toward the bead plate 2 and having a height F larger than that E of the first stepped portions 6 and smaller than the sum of the height E of the first stepped portions 6 and that H of the beads 4 (E+H>F>E), the second stoppers being formed so as to annularly surround the combustion chamber holes 9.

Figure 7:
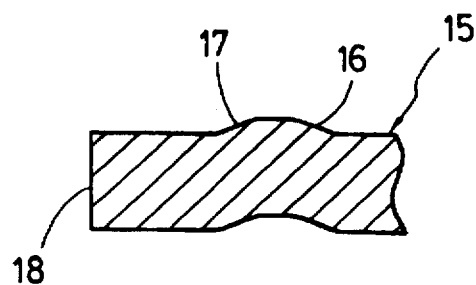
FIG. 7 is a sectional view showing the shape of a stepped portion in a molding step for the production of an intermediate plate in the metal gasket of FIG. 1.
Figure 8:
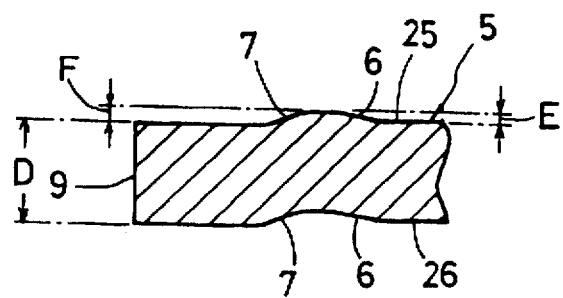
FIG. 8 is a sectional view showing the shape of a stepped portion at the time of completion of a embossing process in the molding step for the production of an intermediate plate in the metal gasket of FIG. 1.

In order to form the stepped portions 6, 7 on the intermediate plate 5, stepped portions 16, 17 of the same depth are molded by sheet metal work process as shown in FIG. 7, in such a manner that the stepped portions extend in a separated state along the circumferences of holes 18, 18. The metal plate 15 is then subjected to an embossing process to form stepped portions 6, 7 as shown in FIG. 8, and the resultant plate is thermally treated to obtain an intermediate plate 5. As a result, the intermediate plate 5 is provided with first stoppers comprising first stepped portions 6 as compensating portions for the beads 3 on the bead plate 1, and second stoppers comprising second stepped portions 7 as compensating portions for the beads 4 on the bead plate 2. In the metal gasket in a free state in which the metal gasket has not yet been tightened, a clearance S is formed between the second stoppers of the intermediate plate 5 and the bead plate 1.

Figure 2:
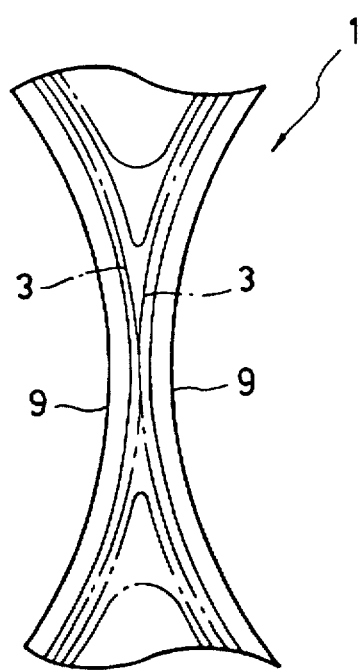
FIG. 2 is an enlarged partial plan view showing the portion of a first bead plate which is in a region between holes of the metal gasket of FIG. 1.
Figure 3:
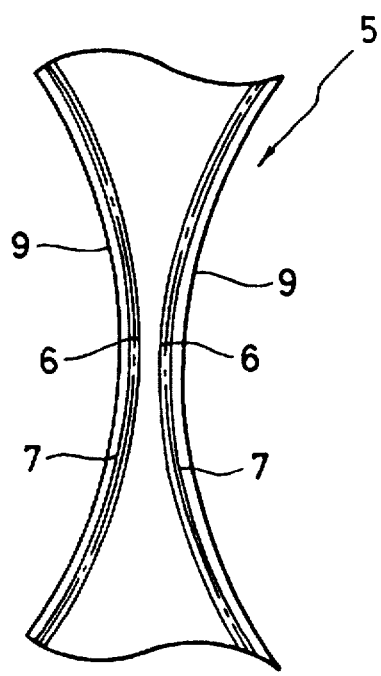
FIG. 3 is an enlarged partial plan view showing the portion of an intermediate plate which is in a region between holes of the metal gasket of FIG. 1.
Figure 4:
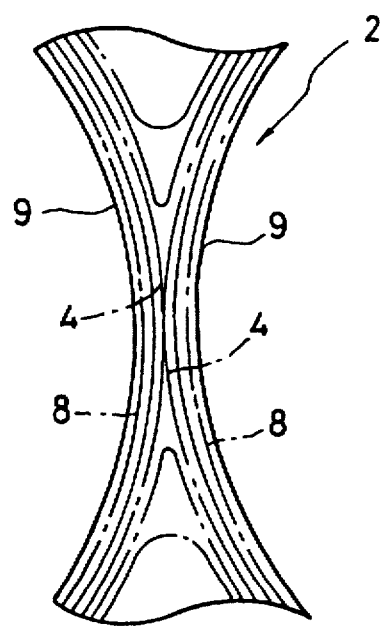
FIG. 4 is an enlarged partial plan view showing the portion of a second bead plate which is in a region between holes of the metal gasket of FIG. 1.
Figure 5:
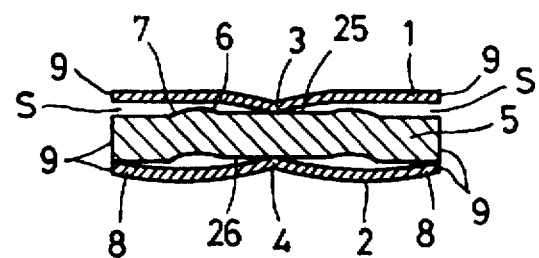
FIG. 5 is an enlarged sectional view showing a region, which is between holes, of the metal gasket of FIG. 1, and taken along the line 5—5 in FIG. 1.
Figure 6:
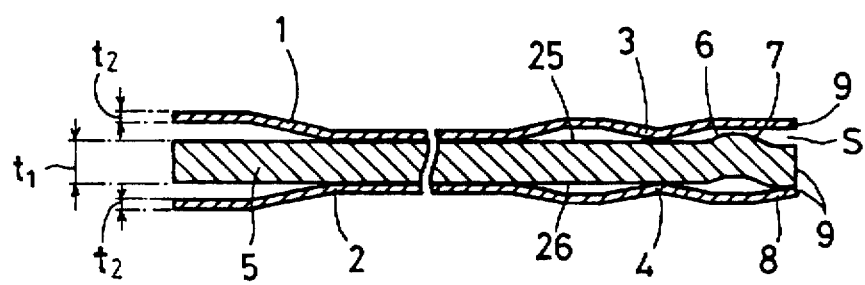
FIG. 6 is an enlarged sectional view showing a region, which is between holes, of the metal gasket of FIG. 1, and taken along the line 6—6 in FIG. 1.

The bead plate 1 is disposed so as to face a cylinder head, while the bead plate 2 is disposed so as to face a cylinder block. The beads 3 on the bead plate 1 meet one another in regions between the holes 9 to form a single bead as shown in FIG. 2. The first stepped portions 6 of the intermediate plate 5 are separated from one another in the regions between the holes 9 as shown in FIG. 3. The beads 4 on the bead plate 2 meet one another in the regions between the holes 9 to form a single bead as shown in FIG. 4. The beads 3, 4 on the bead plates 1, 2 can also be formed so as to be separated from one another in the regions between the holes 9, though such beads are not illustrated.

Figure 9:
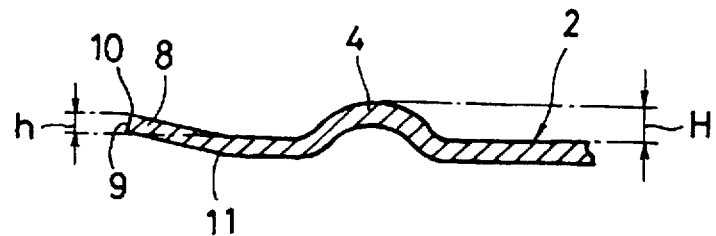
FIG. 9 is a sectional view showing first examples of a bead and an auxiliary bead on a second bead plate in the metal gasket of FIG. 1.

This metal gasket of the above-described construction is characterized in that the bead plate 2 is provided with auxiliary beads 8 formed along the circumferences of the holes 9 and extending toward the second stoppers on the intermediate plate 5. In the first embodiment, the auxiliary beads 8 comprise half beads extending toward the holes 9 and bent incliningly at bending points 11 as shown in FIG. 9. A height h of the auxiliary beads 8 is set substantially a half of that H of the beads 4 on the bead plate 2. Accordingly, when the metal gasket is tightened, the auxiliary beads 8 are brought into circular line contact initially at edge portions 10 at free ends thereof with the surfaces of the first stoppers of the intermediate plate 5, so that the sealability of the gasket can be improved.

When the metal gasket is set between the opposed surfaces of a cylinder head and a cylinder block and tightened by clamping means, the beads 3, 4 on the bead plates 1, 2 are elastically deformed, and gradually come close to and engage the intermediate plate 5.

The first stoppers comprising the first stepped portions 6 of the intermediate plate 5 restrict the amount of displacement of the beads 3 on the bead plate 1 after the beads have engaged the head plate 1, whereby a complete compression, i.e. a full compression of the beads 3 is prevented so as to maintain the function of the beads 3. Since the height E of the first stepped portions 6 constituting the stoppers is smaller with respect to the surface 25 of the intermediate plate 5 than that of the beads 3, the rigidity of the first stoppers is high, so that the function of the first stoppers is not lost even if the stoppers are deformed by a gasket tightening force. Since the first stoppers can prevent the occurrence of a fully compressed condition of the beads 3, an excellent sealability can be secured, and the stress amplitude of the bead plate 1 becomes small. Therefore, large bending stress and stress amplitude do not occur in the first stoppers, and, consequently, cracks and permanent set in fatigue do not occur in the bead plate 1. The first stoppers also has a function of offsetting the irregularity existing in the opposed surface of a cylinder head when the gasket is tightened.

The second stoppers, which comprise the second stepped portions 7, of the intermediate plate 5 are adapted to restrict an amount of displacement of the bead plate 2 after the engagement of the second stoppers therewith, and prevent a complete compression, i.e. a full compression of the beads 4, whereby the function of the beads 4 is maintained. Since the height F of the second stepped portions 7 constituting the stoppers is smaller with respect to the surface 26 of the intermediate plate 5 than that of the beads 4, the rigidity of the second stoppers is high, so that the function of the second stoppers is not lost even if they are deformed by a gasket tightening force. Since the second stoppers can prevent the occurrence of a fully compressed condition of the beads 4, an excellent sealability can be secured, and the stress amplitude of the bead plate 2 becomes small, so that large bending stress and stress amplitude do not occur in the second stoppers. As a result, cracks and permanent set in fatigue do not occur in the bead plate 2. The second stoppers also have a function of offsetting the irregularity existing in the opposed surface of a cylinder block when the gasket is tightened.

The intermediate plate 5 is formed out of a metal softer than that of the bead plates 1, 2. For example, the bead plates 1, 2 are formed out of SUS301, and the intermediate plate 5 serving as a regulating plate SECC (soft steel plate).

Figure 12:
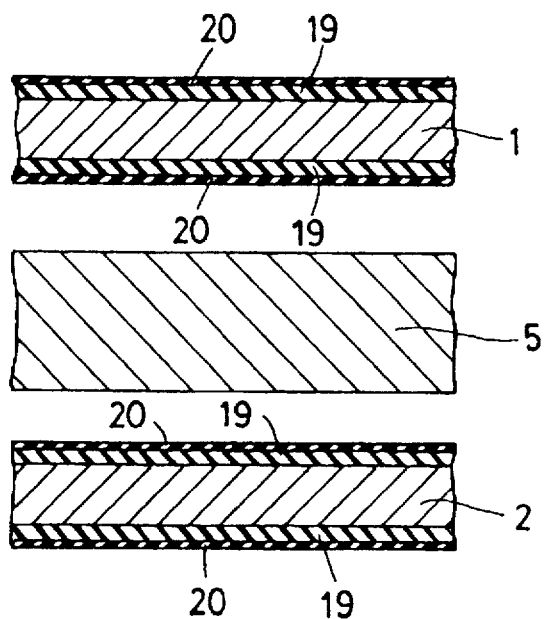
FIG. 12 is an exploded view illustrating bead plates and an intermediate plate.
Figure 13:
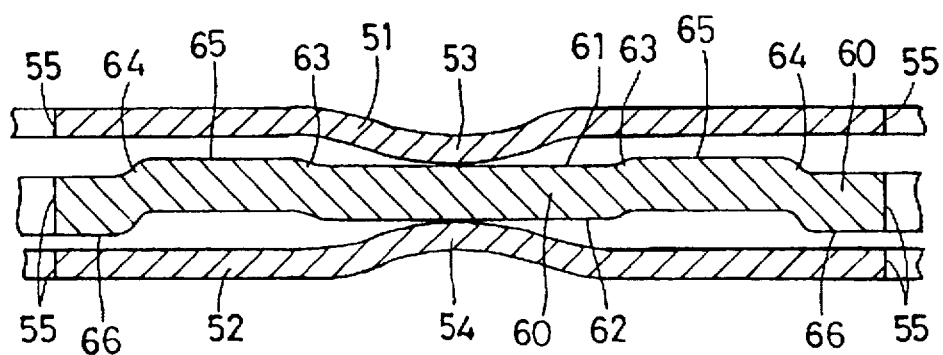
FIG. 13 is a sectional view showing a prior art metal gasket.

As shown in FIG. 12, the surfaces of the elastic metal plates constituting the bead plates 1, 2 are coated with a heat- and oil-resisting nonmetallic material to a thickness of, for example, around 10–50 μm so as to avoid a metal-to-metal contacting condition thereof with respect to the cylinder head and cylinder block, whereby the corrosion resistance, durability and strength of the metal gasket are secured. For example, the upper and lower surfaces of the bead plates 1, 2 are coated with fluororubber 19 having heat- and oil-resistance, and the surfaces of the layers of fluororubber 19 an acrylic silicone resin 20. Even when fine recesses and projections exist in and on the machined surfaces of the bead plates 1, 2, the nonmetallic material applied to these surfaces cover the recesses and projections, so that the bead plates fulfil the sealing function sufficiently.

Figure 10:
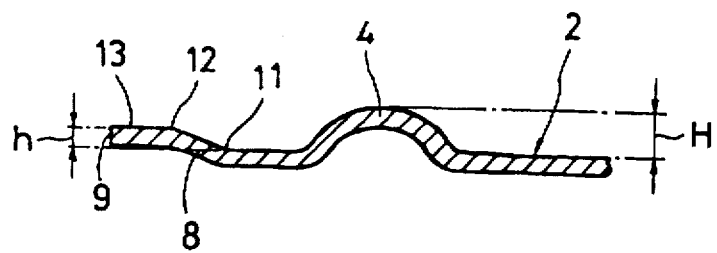
FIG. 10 is a sectional view showing second examples of a bead and an auxiliary bead on a second bead plate in the metal gasket of FIG. 1.

A second embodiment of the metal gasket according to the present invention will now be described with reference to FIG. 10.

The second embodiment has the same construction and function as the first embodiment except that the shape of the auxiliary beads is different. Therefore, the same parts are designated by the same reference numerals, and the duplication of description thereof is omitted. In the second embodiment, auxiliary beads 8 on a bead plate 2 are formed so as to extend along the circumferential portions of holes 9 thereof and project toward second stoppers on an intermediate plate 5. In the second embodiment, the auxiliary beads 8 extend toward the holes 9, and are bent incliningly at the bending points 11. They further extend toward the holes 9, and are bent at the bending points 12. Thus, the auxiliary beads 8 are bent in a stepped manner in two positions, and formed into half beads having flat portions 13 along the circumferential portions of the holes 9. A height h of the auxiliary beads 8 is set substantially a half of that H of beads 8 on the bead plate 2. Accordingly, when the gasket is tightened, the flat portions 13 of the auxiliary beads 8 on the bead plate 2 engage first the surfaces of the second stoppers of the intermediate plate 5, whereby the damage to the intermediate plate 5 due to the bead plate 2 decreases.

Figure 11:
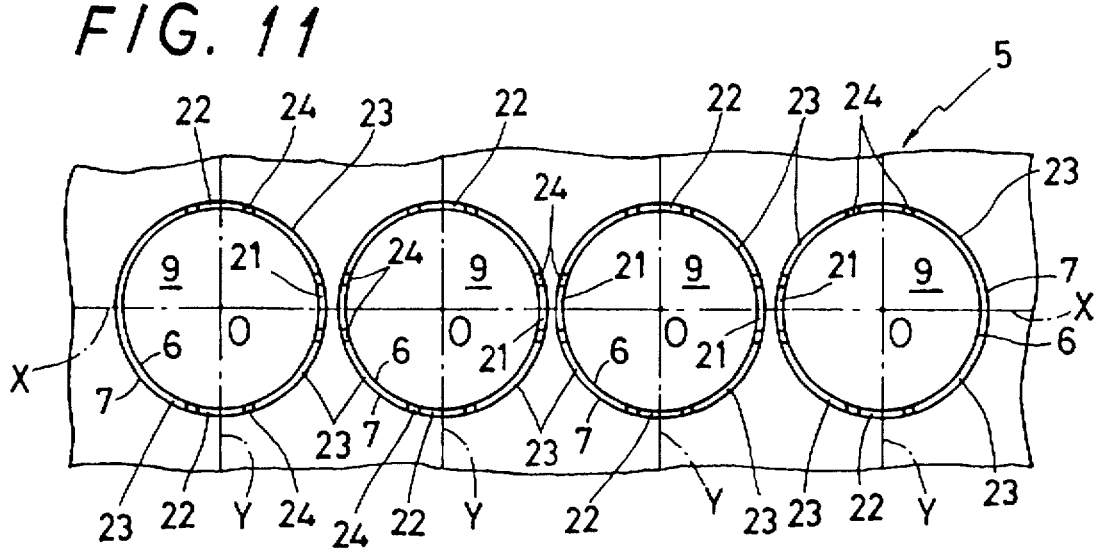
FIG. 11 is a plan view showing a third embodiment of the metal gasket according to the present invention.

A third embodiment of the metal gasket according to the present invention will now be described with reference to FIG. 11.

The first and second stepped portions 6, 7 on an intermediate plate 5 are formed to a large height in first regions 21 between holes 9, and in regions on straight lines Y passing the centers 0 of the holes 9 and perpendicular to a center line X passing the centers 0 of the holes, i.e., in second regions 22 90° away from the regions between the holes 9, and to a small height in regions other than the mentioned regions, i.e., in third regions 23. The height of these stepped portions 6, 7 vary in boundary regions 24 between the first and third regions 21, 23 and between the third and second regions 23, 22 so as to form smoothly curved surface portions. For example, the height of the first and second stepped portions 6, 7 formed on the intermediate plate 5 is set to around 60 μm in the regions 21, 22, and around 30 μm in the regions 23.

The height of the first and second stepped portions 6, 7, which differ in different regions, is set large in the regions far away from the positions in which bolts for fixing a cylinder head to a cylinder block are tightened, so as to have the same stepped portions possess a function of equalizing the surface pressures of the beads 3, 4 on the bead plates 1, 2. When occasion demands, the first and second stepped portions 6, 7 can be formed to a large height in the regions 21 between the holes 9, and to a small height in the regions other than the regions between the holes 9. Thus, the auxiliary beads act to balance surface pressures on the first and second regions, such that surface pressures of the first and second regions of the first and second stoppers are in a balanced distribution.

In the metal gasket according to the present invention, the first and second stoppers on the intermediate plate are formed continuously along the circumferences of the holes as in these embodiments described above but the way in which the stoppers are formed is not limited to that in each of the above embodiments. When occasion demands, the first and second stoppers on the intermediate plate can be formed partially or intermittently along the circumferences of the holes.

What is claimed is:

1. A metal gasket comprising first and second bead plates formed of elastic metal plates on which respective beads are formed along the circumferences of holes provided side by side, said respective beads opposed to each other, and an intermediate plate interposed between said first and second bead plates, and having a thickness larger than thicknesses of said bead plates, said intermediate plate being provided on first regions thereof which are on an inner side of said beads with first stoppers comprising first stepped portions extending toward said first bead plate and formed to a first height smaller than that of said beads, said intermediate plate being further provided on second regions thereof which are on the inner side of said first stepped portions with second stoppers comprising second stepped portions extending toward said second bead plate and formed to a second height larger than that of said first stepped portions and smaller than the sum of the first height of said first stepped portions and that of said beads, said second bead plate being provided with auxiliary beads extending along the circumferences of said holes and projecting so as to abut said second stoppers of said intermediate plate, said auxiliary beads comprising means for surface pressures of said second regions of said second stoppers to be increased by said auxiliary beads of said second bead plate, and further for balancing surface pressures of said first and second regions of said first and second stoppers.

2. A metal gasket according to claim 1, wherein said auxiliary beads comprise half beads extending toward said holes and bent diagonally.

3. A metal gasket according to claim 1, wherein said auxiliary beads comprise half beads extending toward said holes, bent in a stepped manner and provided with flat portions along the circumferences of said holes.

4. A metal gasket according to claim 1, wherein the height of said auxiliary beads is substantially a half of that of said beads on said second bead plate.

5. A metal gasket according to claim 1, wherein heights of said first and second stepped portions of said intermediate plate are set larger in first circumferential regions, which are between said holes, and second circumferential regions, which are 90° away from the positions between said holes, and smaller in third circumferential regions which are halfway between said first and second circumferential regions, the heights of said stepped portions varying in first circumferential boundary regions between said first and third circumferential regions and second circumferential boundary regions between said third and second circumferential regions so as to form smoothly curved surface portions.

6. A metal gasket according to claim 1, wherein said first stepped portions of said'intermediate plate are separated from one another in the regions between said holes.

7. A metal gasket according to claim 1, wherein said first bead plate is disposed so as to face a cylinder head, said second bead plate being disposed so as to face a cylinder block.

8. A metal gasket according to claim 1, wherein said beads on said first and second bead plates are separated from one another between said holes.

9. A metal gasket according to claim 1, wherein said beads on said first and second bead plates meet one another to form a single bead.

* * * * *